United States Patent [19]
Penrith

[11] Patent Number: 5,817,162
[45] Date of Patent: Oct. 6, 1998

[54] METHOD OF MAKING A CONTAINER FROM A BOTTLE

[76] Inventor: Sean Cameron Penrith, Johannesburg, South Africa

[21] Appl. No.: 424,278

[22] PCT Filed: Oct. 22, 1993

[86] PCT No.: PCT/GB93/02181

§ 371 Date: Sep. 18, 1995

§ 102(e) Date: Sep. 18, 1995

[87] PCT Pub. No.: WO94/08909

PCT Pub. Date: Apr. 28, 1994

[30] Foreign Application Priority Data

Oct. 22, 1992 [GB] United Kingdom ............... 92/8153

[51] Int. Cl.$^6$ .......................... C03B 21/00; C03B 23/26; C03B 33/00; C03B 33/08
[52] U.S. Cl. .................... 65/112; 65/36; 65/56; 65/DIG. 10; 428/903.3; 215/387
[58] Field of Search .................... 65/36, 43, 56, 65/61, 105, 111, 112, DIG. 10; 215/387; 428/903.3

[56] References Cited

U.S. PATENT DOCUMENTS

| | | | |
|---|---|---|---|
| 2,074,784 | 3/1937 | Games | 49/24 |
| 3,839,005 | 10/1974 | Meyer | 65/112 |
| 5,338,327 | 8/1994 | Ohga et al. | 65/414 |

FOREIGN PATENT DOCUMENTS

| | | |
|---|---|---|
| 735287 | 4/1932 | France . |
| 1398595 | 6/1975 | United Kingdom . |

OTHER PUBLICATIONS

*Popular Mechanics Do–It–Yourself Yearbook*; pp. 138–141, Book Division, Hearst Magazines, N.Y., 1974.
*Money–Making Formulas*; pp. 260–268, Angus and Robertson, Halstead Press Pty. Ltd., Sydney Australia, 1949.

*Primary Examiner*—Donald E. Czaja
*Assistant Examiner*—Jacqueline A. Ruller
*Attorney, Agent, or Firm*—Longacre & White

[57] ABSTRACT

The invention relates to a method of forming a goblet from a glass bottle of the type having a base, a body portion extending from the base and converging towards a neck which terminates in a lip defining a mouth. The method comprises the steps of severing the base from the body portion along a first severance plane which is proximate the base and normal to a central axis of the bottle, and removing a waste portion of the body along a second severance plane which is parallel to the first severance plane. The mouth of the bottle is then glued or fused to a center portion of an upper surface of the base so as to form the goblet, with the base of the bottle forming a foot of the goblet, the neck of the bottle forming a stem of the goblet and the body portion of the bottle defining a bowl of the goblet. The method may include the step of plugging the neck of the bottle so as to form a solid stem.

19 Claims, 2 Drawing Sheets

U.S. Patent    Oct. 6, 1998    Sheet 1 of 2    5,817,162
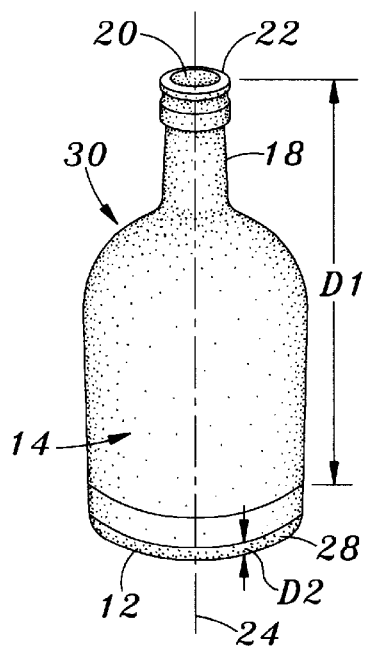
FIG. 1
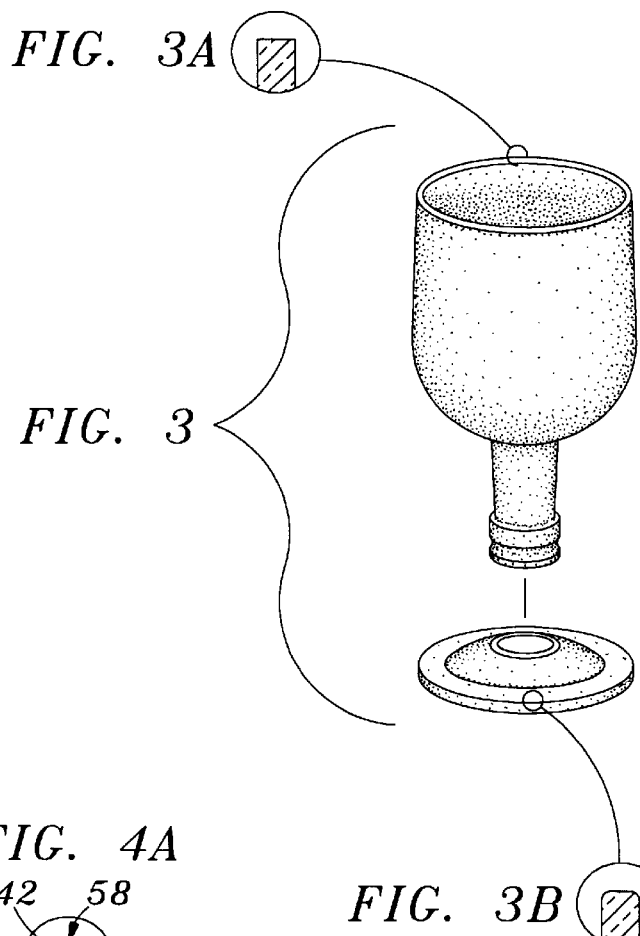
FIG. 3
FIG. 3A
FIG. 3B
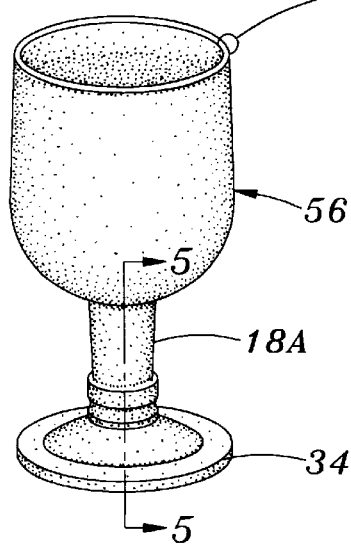
FIG. 4
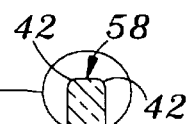
FIG. 4A
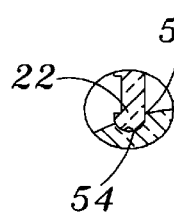
FIG. 5A
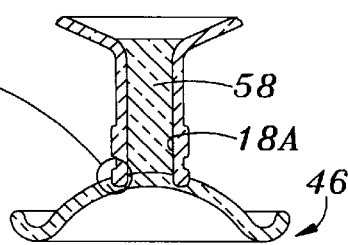
FIG. 5

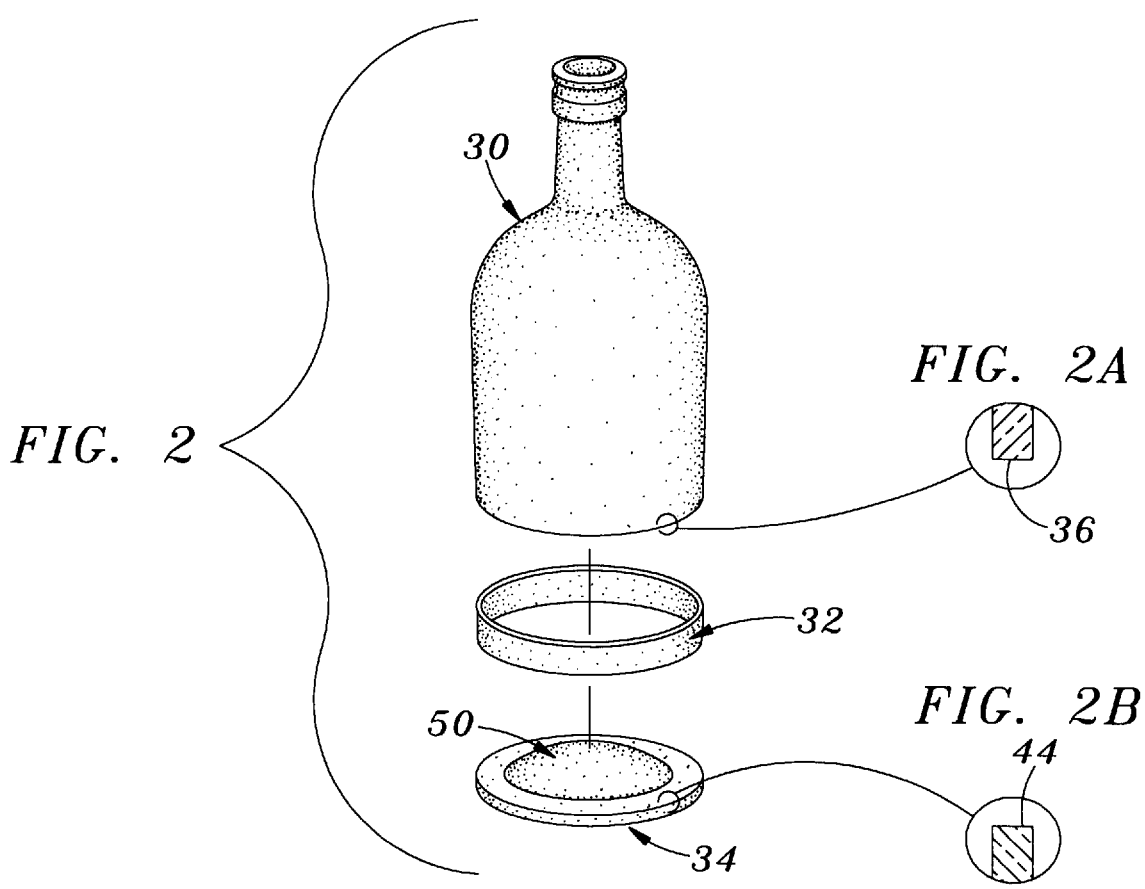

METHOD OF MAKING A CONTAINER FROM A BOTTLE

BACKGROUND OF THE INVENTION

THIS invention relates to a method of making a container from a bottle, and in particular to a method of forming a goblet from a glass bottle of the type having a base, a cylindrical body portion extending from the base and converging towards a neck which terminates in a lip.

Most glass bottles are non-returnable, in that they do not attract a deposit after they have been used. As a result, they create a significant pollution problem, which is exacerbated by the fact that most discarded bottles are eventually broken so as to form hazardous shards of glass.

With the recent increase in environmental awareness, recycling of non-returnable bottles is taking place. Most of these bottles are not used in their existing form, but are melted down, with the resultant amalgam of relatively low quality glass only having limited uses. Furthermore, considerable energy is involved in the recycling process, which involves melting the glass and removing various impurities.

SUMMARY OF THE INVENTION

According to a first aspect of the invention there is provided a method of forming a goblet from a glass bottle of the type having a base, a body portion extending from the base and converging towards a neck which terminates in a lip defining a mouth, the method comprising the steps of severing the base from the body portion along at least a first severance plane which is proximate the base and normal to a central axis of the bottle, and affixing the mouth of the bottle to a centre portion of the base so as to form the goblet, with the base of the bottle forming a foot of the goblet, the neck of the bottle forming a stem of the goblet and a body portion of the bottle defining a bowl of the goblet.

Preferably, the method includes the steps of removing a waste portion of the body along a second severance plane which is parallel to the first severance plane.

Conveniently, the first severance plane is a predetermined distance from the base of the bottle and the second severance plane is a predetermined distance from the mouth of the bottle.

Typically, the mouth of the bottle is affixed to an uppermost interior surface of the base of the bottle.

Alternatively, the mouth of the bottle is affixed to a lowermost exterior surface of the base of the bottle.

In one form of the invention, the method includes the step of forming an annular indent in the centre of the upper-or lowermost surfaces of the base, the indent being profiled to seat the lip of the bottle in a complementary fit.

The method may include the step of plugging the neck of the bottle with molten glass so as to form a solid stem.

In one form of the invention, the method includes the step of affixing at least one handle to the bowl of the goblet.

The base may be severed from the body by forming a score line around the outer periphery of the body, and subjecting the score line to a thermal shock in the form of a temperature differential so as to cause the body to crack along the score line.

The temperature differential is typically applied by heating the body in the region of the score line using a flame or a hot fluid, and subsequently cooling the body using a relatively cold fluid.

Alternatively, a high resolution cutting flame may be used to sever the base from the body, the cutting flame simultaneously smoothing the exposed edges forming the rim of the bowl and the outer periphery of the foot.

An abrasive saw or a laser cutting device may also be used to sever the base from the body.

The mouth may be glued to the base by using an ultra violet curing adhesive.

Alternatively, the mouth is affixed to the base by heating the glass to at least the fibre softening point of the glass and fusing the mouth and the base.

In a further form of the invention, the mouth is mechanically affixed to the base by a screwing or bolting operation.

The method typically includes the step of forming a flattened rim of the glass by flattening an edge of the body of the bottle which is exposed as a result of the severing step.

The method may include the further step of bevelling of the flattened rim using an abrasive belt or an abrasive wheel.

The rim may subsequently be polished using an abrasive belt or a disk, a polishing paste, a flame or a laser.

The edge which is exposed at the outer periphery of the base during the severance step is typically ground using a belt or a grinding wheel, and may subsequently be polished.

The invention extends to a goblet which is formed from a glass bottle of the type having a base, a body portion extending from the base and converging towards a neck which terminates in a lip defining a mouth, the goblet comprising a foot formed from the base of the bottle, a stem formed from the neck of the bottle and affixed to the base at the mouth of the neck, and a bowl defined by the body portion of the bottle.

BRIEF DESCRIPTION OF THE DRAWINGS

FIGS. 1 to 4 show perspective views of the various steps involved in one method of manufacturing a goblet from a bottle; and FIG. 5 shows a cross-section of the foot and stem of the goblet on the line 5—5 of FIG. 4.

DESCRIPTION OF EMBODIMENTS

Referring first to FIG. 1, a glass wine bottle 10 is shown having a base 12, a round cylindrical body portion 14 extending from the base converging at a convex shoulder 16 to a neck 18 which terminates in a mouth 20 defined by an annular lip 22. The bottle is symmetrical about a central axis of symmetry 24.

The first step in the goblet manufacturing process involves mounting the bottle 10 on a lathe chuck or a similar turning device and rotating it on the lathe about its axis of symmetry 24. First and second score lines 26 and 28 are then formed around the circumference of the body portion 14 of the bottle by means of a rotary glass cutter, in respective first and second severance planes which are normal to the central axis 24. The first score line 26 is formed a predetermined distance d1 away from the lip 22 of the bottle, the distance d2 away from the lowermost surface of the base 12 of the bottle, the distance d2 corresponding at least to the thickness of the glass forming the base 12. In the case where identical bottles are being processed, the glass cutting rollers may be preset on a carriage adjacent the lathe so as to pivot into and out of contact with the bottle.

Referring now to FIG. 2, the bottle is cracked along the score lines 26 and 28 by subjecting the score lines to a temperature differential. This may be achieved by progressively immersing the lower portion of the bottle in hot and then cold water so as to cause the bottle to crack along the score lines 26 and 28. As a result, the bottle separates into an upper neck and body portion 30, an intermediate redundant or waste portion 32 and a lower base portion or foot 34. The redundant portion 32 is discarded for recycling, and the lowermost rough edge 36 of the body and neck portion 30 is then smoothed to a flat surface, as is shown in detail at 38 in FIG. 3.

This is achieved either by using a sandpaper formed from aluminium oxide or silicon carbide having a P220 specification, by using a diamond grit wheel, or by means of an adhesive compound such as a diamond, carborundum or pumice paste which is poured onto a moving planar surface onto which the rough edge 36 is pressed. The uppermost surface of the lip 22 may also be slightly flattened. The corners 40 of the edge are then bevelled by means of an abrasive wheel in the form of an aluminium oxide stone which runs in water. Alternatively, a sanding belt or a diamond wheel may be used to bevel away the corners, as is shown in detail at 42.

The upper roughened edge 44 of the base 34 is then ground by using a coarse grit belt, a diamond wheel or an aluminium oxide or silicon carbide grinding wheel to a rounded profile indicated in detail at 46. During the grinding operation, the base 34 is clamped in a chuck or a suitable drill press.

In the bottle illustrated in the particular embodiment, the base of the bottle is dished, as is shown at 50, so as to define an uppermost convex surface 52. An annular channel or indent 54 is formed in the uppermost convex surface by means of a tungsten carbide or diamond coated routing tool. During the routing operation, the foot 34 is clamped in position within a drill press. In order to ensure axial symmetry of the goblet, the annular channel 54 is formed in the center of the foot 34.

It is clear from FIG. 5 how the annular channel 54 is profiled to accommodate the lip 22 of the bottle in a snug complemental fit.

Prior to the lip 22 being fixed in position within the channel 54 so as to form the finished goblet 56, the rim or lip 58 of the goblet 56 is polished by means of a belt sanding machine using 360 grit sandpaper. The uppermost surface of the lip may be flattened. This is followed by a 1200 grit silicon carbide sanding belt, which gives the rim 58 a shiny finish. Polishing of the rounded edge 46 of the foot is also achieved by means of the belt sander. A cork belt or a cerium oxide disc or slurry may also be used in the polishing process. On completion of the grinding and polishing stages, both the foot 34 and the neck and body portions 30 are cleaned using carbon tetrachloride or trichloroethylene prepared with a saline A187 solution.

An ultra-violet curing adhesive 59 such as X175/58/11 manufactured by Dymax Corporation under code 425 is then applied both to the lip 22 and to the annular channel 54. The lip 22 is then pressed into position, as is shown in FIGS. 4 and 5, and the adhesive is cured using an ultra-violet lamp having an intensity of approximately 25 mW cm$^{-2}$ and a wavelength of 365 nm. The curing time can vary from forty seconds to five minutes. It is clear from the goblet 56 illustrated in FIG. 4 how the neck 18' of the bottle forms a stem 18A of the goblet, the body 14 of the bottle forms the bowl 14A of the goblet and the base 12 of the bottle forms the foot 34 of the goblet. As a final step in the manufacturing process, molten glass is poured into the hollow stem 18A of the goblet so as to define a plug 58. In this embodiment, the glass is heated up past its fibre-softening point of about 540° C. and the molten glass is poured into the hollow stem and allowed to anneal in a controlled cooling environment. One or more glass handles of ears may then be glued or fused onto the outer surface of the bowl 14A.

There are a number of alternatives to the various method steps described above. For example, in the method of scoring the bottle and applying a thermal shock or rapid temperature differential to the region of the score lines, hot liquid may be poured into the bottle, followed by external drenching of the bottle by relatively cold liquid. An alternative method of cutting the bottle is to use a high resolution cutting flame. In one embodiment, the flame extends from a circular flame ring which surrounds the bottle at a predetermined location along the bottle. An advantage of using a cutting flame is that the edges of the bottle are simultaneously smoothed during the cutting process, thereby obviating the need to finish the edges separately.

As still further alternatives, a laser beam may be used to cut or to induce thermal shock in the bottle, or a diamond saw may be used to cut through the bottle.

There are also a number of different ways in which the mouth of the bottle may be joined to the base of the bottle. In a method involving heat fusion, the lip of the bottle and the upper surface of the base or foot 34 are brought together and are heated past the fibre-softening point of the glass to approximately 540° C. The contact zones are further heated to melting point, and are then brought together for heat fusion or bonding. They are subsequently cooled relatively slowly so as to prevent stress in the glass. Suitable lasers may also be used to generate very controlled and localised heat. Alternative adhesives such as an Araldite® AW104 two-part adhesive, and other epoxy-or acrylic-based adhesives may also be used.

A mechanical connection may optionally be formed between the neck and the base. For instance, a female thread may be cut into the base, and a complemental male thread may be formed in the lip, thereby allowing the neck to be screwed into the base. Alternatively, a stopper carrying a threaded shaft may be inserted into the neck, after which the foot is bolted or screwed into position.

I claim:

1. A method of forming a goblet from a glass bottle of the type having a base, a body portion extending from the base and converging towards a neck which terminates in a lip defining a mouth, the method comprising the steps of severing the base to form a severed base from the body portion along at least a first severance plane which is proximate the base and normal to a central axis of the bottle, and affixing the mouth of the bottle to a centre portion of an uppermost interior surface of the base of the bottle so as to form the goblet, said uppermost interior surface including a convex portion which exceeds in height a peripheral rim of said severed base, with the base of the bottle forming a foot of the goblet, the neck of the bottle forming a stem of the goblet and the body portion of the bottle defining a bowl of the goblet.

2. A method according to claim 1 which includes the step of removing a waste portion of the body along a second severance plane which is parallel to the first severance plane.

3. A method of forming a goblet from a glass bottle of the type having a base, a body portion extending from the base and converging towards a neck which terminates in a lip defining a mouth, the method comprising the steps of severing the base from the body portion along at least a first severance plane which is proximate the base and normal to a central axis of the bottle, forming an annular indent in the centre of the uppermost surface of the base, the indent being profiled to seat the lip of the bottle in a complemental fit, and affixing the mouth of the bottle to a center portion of an uppermost interior surface of the base of the bottle so as to form the goblet, with the base of the bottle forming a foot of the goblet, the neck of the bottle forming a stem of the goblet and the body portion of the bottle defining a bowl of the goblet.

4. A method according to claim 1 which includes the step of plugging the neck of the bottle so as to form a solid stem.

5. A method according to claim 4 in which the neck is plugged with molten glass.

6. A method according to claim 1 which includes the step of affixing at least one handle to the bowl of the goblet.

7. A method according to claim 1 in which the base is severed from the body by forming a score line around the outer periphery of the body, and subjecting the score line to a thermal shock in the form of a temperature differential so as to cause the body to crack along the score line.

8. A method according to claim 7 in which the temperature differential is applied by heating the body in the region of the score line using a flame or a hot fluid, and subsequently cooling the body using a relatively cold fluid.

9. A method according to claim 1 in which a high resolution cutting flame is used to sever the base from the body, the cutting flame simultaneously smoothing the exposed edges forming the rim of the bowl and the outer periphery of the foot.

10. A method according to claim 1 in which an abrasive saw is used to sever the base from the body.

11. A method according to claim 1 in which a laser cutting device is used to sever the base from the body.

12. A method according to claim 1 in which the mouth is glued to the base using an ultra violet curing adhesive.

13. A method according to claim 1 in which the mouth is affixed to the base by heating the glass to at least the fiber softening point of the glass and fusing the mouth and the base.

14. A method according to claim 1 in which the mouth is mechanically affixed to the base by a screwing or bolting operation.

15. A method according to claim 1 which includes the step of forming a flattened rim of the glass by flattening an edge of the body of the bottle which is exposed as a result of the severing step.

16. A method according to claim 15 which includes the further step of bevelling the flattened rim using an abrasive belt or an abrasive wheel.

17. A method according to claim 1 in which the rim is subsequently polished using an abrasive belt or disc, a polishing paste, a flame or a laser.

18. A method according to claim 1 in which the edge which is exposed at the outer periphery of the base during the severance step is ground using a belt of a grinding wheel.

19. A method according to claim 18 in which the edge is subsequently polished.

* * * * *